United States Patent
Joshi et al.

(10) Patent No.: US 11,907,137 B2
(45) Date of Patent: Feb. 20, 2024

(54) SYSTEMS AND METHODS FOR LEADER NODE ELECTION IN CLUSTER SERVER CONFIGURATIONS

(71) Applicant: Capital One Services, LLC, McLean, VA (US)

(72) Inventors: Rohit Joshi, Plano, TX (US); Ashish Gupta, Richmond, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 60 days.

(21) Appl. No.: 17/585,387

(22) Filed: Jan. 26, 2022

(65) Prior Publication Data

US 2023/0251976 A1    Aug. 10, 2023

(51) Int. Cl.
*G06F 12/123* (2016.01)
*H04L 67/568* (2022.01)
*G06F 15/173* (2006.01)

(52) U.S. Cl.
CPC ...... *G06F 12/123* (2013.01); *G06F 15/17331* (2013.01); *H04L 67/568* (2022.05); *G06F 2212/251* (2013.01)

(58) Field of Classification Search
CPC .............................. G06F 12/10–12/123; G06F 15/17306–15/17331; H04L 67/50–67/568
See application file for complete search history.

(56) References Cited

U.S. PATENT DOCUMENTS

| | | | |
|---|---|---|---|
| 9,800,087 B2 | 10/2017 | Kouroussis et al. | |
| 10,454,754 B1 * | 10/2019 | Patel | H04L 41/0654 |
| 2005/0132154 A1 | 6/2005 | Rao et al. | |
| 2006/0235972 A1 | 10/2006 | Asnis | |
| 2007/0091889 A1 * | 4/2007 | Xiao | H04L 45/00 370/312 |
| 2014/0269776 A1 * | 9/2014 | Bomfim | H04N 21/237 370/503 |
| 2018/0115456 A1 | 4/2018 | Bendre et al. | |
| 2019/0394266 A1 | 12/2019 | Fukuyamu et al. | |
| 2021/0271489 A1 | 9/2021 | Singhal | |

FOREIGN PATENT DOCUMENTS

| | | | |
|---|---|---|---|
| CN | 107 800 737 | | 3/2018 |
| CN | 111355600 A | * | 6/2020 |
| CN | 111 400 112 | | 7/2020 |

OTHER PUBLICATIONS

Notification of Transmittal of the International Search Report and the Written Opinion of the International Searching Authority issued in PCT/US2023/011447, dated Jul. 24, 2023, 23 pages.

* cited by examiner

*Primary Examiner* — Clayton R Williams
(74) *Attorney, Agent, or Firm* — HUNTON ANDREWS KURTH LLP

(57) ABSTRACT

Disclosed are systems and methods for leader node election, comprising a cluster system including a plurality of nodes, a node registry, wherein nodes are configured to transmit registration requests to the node registry, receive node data is response, and to determine a leader node based on the earliest registered node, and wherein the leader node is configured to dynamically allocate data slots between the plurality of nodes, and each of the nodes are configured to store data associated with allocated data slots in an in-memory least recently used component and data associated with all of the data slots in a persistent storage component.

20 Claims, 10 Drawing Sheets

_US 11,907,137 B2_

1

SYSTEMS AND METHODS FOR LEADER NODE ELECTION IN CLUSTER SERVER CONFIGURATIONS

FIELD OF THE DISCLOSURE

The present disclosure is generally related to leader node election in distributed cluster server arrangements.

BACKGROUND

Leader election node in a multi-node distributed cluster is challenging. Conventional approaches have attempted to address node failure in such configurations by utilizing overly complex protocols and/or adding additional components. Such conventional approaches, however, fail to adequately minimize node failure time and the adverse performance and latency impacts of utilizing such multi-node cluster systems.

These challenges can be worsened during a node failure. In such situations, the shortcomings of conventional approaches can be more pronounced when one or more nodes are not available.

These and other drawbacks exist in the conventional art. Accordingly, there is a need to effectively and efficiently select a leader node.

SUMMARY OF THE DISCLOSURE

Embodiments of the present disclosure provide a system, method, and a non-transitory computer-accessible medium having stored thereon computer-executable instructions for leader node election in cluster arrangements.

Exemplary embodiments provide a system, method, and computer arrangement for leader node election comprising; a cluster system comprising a plurality of nodes; and a node registry in data communication with the cluster system; wherein the node registry is configured to: receive registration requests from the plurality of nodes; and update node data with a registration time, a ID, and address of each of the plurality of nodes based on the registration requests; wherein the each of the plurality of nodes are configured to: transmit a registration request to the node registry at startup; receive the node data from the node registry; and identify a leader node based on an earliest registered node in the node data.

In addition, a leader node can be configured to update a fully qualified domain name (FQDN) of the cluster system with an IP address of the leader node. The cluster system can further comprise a plurality of data slots, and wherein each of the plurality of nodes is allocated with a portion of the data slots. Further, each of the plurality of nodes can be configured to store data associated with data slots allocated to it in an in-memory least recently used component. A client driver can be configured to determine a data slot associated with a client request based on a key in the client request.

Further, the client driver is configured to route the client request to a node in the cluster system allocated with the data slot. The node allocated with the data slot can be configured to access data associated with the data slot from an in-memory least recently used component of the node in response to the client request. The in-memory least recently used component can be a non-volatile express memory disk. In addition, the plurality of nodes are configured to transmit a cluster password to the leader node before joining the cluster system. The leader node can also be configured to determine a node status of each of the plurality of nodes and to adjust an allocation of the data slots based on the node status of each of the plurality of nodes, and to reallocate at least one data slot previously allocated to a first node, to a second node when the leader node determines that the second node is not responsive.

Further, a second node can be configured to load data associated with the at least one data slot previously allocated to the first node to an-in memory least recently used (LRU) component of the second node, and can also be configured to retrieve the data associated with the at least one data slot previously allocated to the first node from a persistent storage component of the second node. Further, the leader node can be configured to transmit cluster topology data to a client driver.

In addition, data associated with a data slot allocated to the first node can be updated; and automatically transmitted to a second node in the plurality of nodes. Further, a second node can be configured to store the updated data in a persistent storage component of the second node. A first node can further be configured to periodically transmit a registration request to the node registry and retrieve node data in response, and determine a leader node in response. A leader node can further be configured to determine a status of each of the plurality of the nodes.

BRIEF DESCRIPTION OF THE DRAWINGS

Various embodiments of the present disclosure, together with further objects and advantages, can best be understood by reference to the following description taken in conjunction with the accompanying drawings.

DETAILED DESCRIPTION

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

The present disclosure provides a computer implemented cluster system and method for minimizing impact during node failure and facilitates the efficient management, discovery, and synchronization of a cluster system, Exemplary embodiments can provide a cluster system and method for leader node election and allocation of data slots. Benefits of the system and methods disclosed herein include providing a systems and methods where a database can be portioned and dynamic stored in an in-memory least recently used (LRU) cache of a plurality of nodes in a cluster system in order facilitate high performance, resiliency, and scalability, and provides rich key-value store. Exemplary embodiments provide an innovative leader node election determination protocol in order to eliminate complicate communications and excessive additional cluster system components in determining the leader node. Exemplary systems and methods disclosed herein can readily be deployed and is highly configurable. For example, an application implementing the exemplary cluster system can be efficiently operated without the need for additional physical isolated servers—eliminating the need for network hops.

Exemplary embodiments provide that each node in the cluster system include both an in memory LRU cache component and a persistent storage component. Exemplary embodiments can support, for example, Redis Serialization Protocol (RSP) and Hypertext Transfer Protocol Secure (HTTPS), and can support, for example, the following network interfaces standards: TCP, SSL/TLS (TLS1.2/TLS1.3), and Unix Socket Domain.

Figure 1:
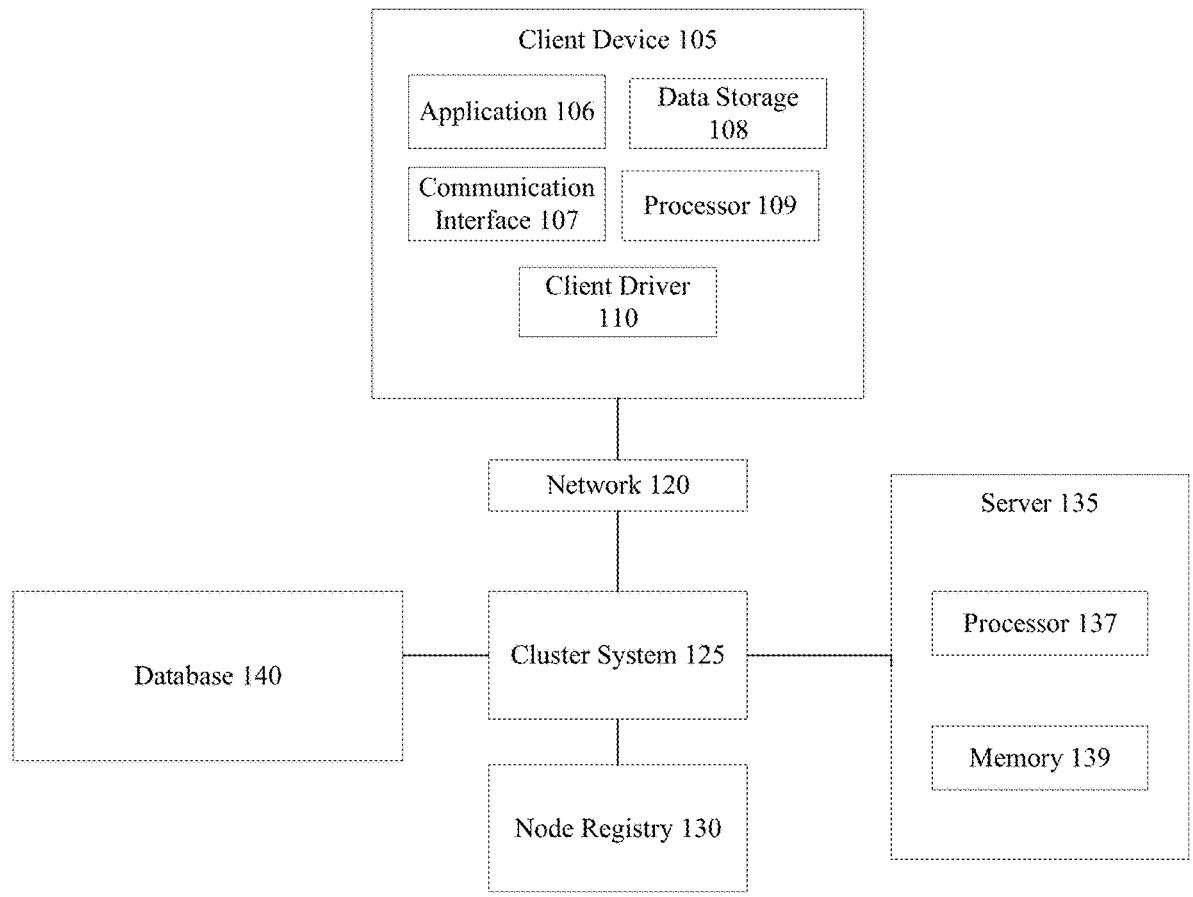
FIG. 1 illustrates an exemplary cluster node-leader management system.

FIG. 1 illustrates an exemplary cluster node-leader management system 100. The system 100 can comprise a client device 105, network 120, a cluster system 125, a node registry 130, a server 135, and a database 140. FIG. 1 may reference the same or similar components, and data as the other figures set forth herein.

The client device 105 can include a network-enabled computer system and/or device. As referred to herein, a network-enabled computer system and/or device can include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, a smart card, or other device. The network-enabled computer systems can execute one or more software applications to, for example, receive data as input from an entity accessing the network-enabled computer system, process received data, transmit data over a network, and receive data over a network.

The client device 105 can include at least one processor 109, which can be a central processing unit (CPU), which can be configured to execute computer program instructions to perform various processes and methods. The at least one CPU can comprise several processors, a single processor, or a single device having multiple processors.

The client device 105 can include a data storage 108, including for example, random access memory (RAM) and read only memory (ROM), which can be configured to access and store data and information and computer program instructions. The data storage can also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email account application and/or other applications, and data files can be stored. The data storage of the network-enabled computer systems can include electronic information, files, and documents stored in various ways, including, for example, a flat file, indexed file, hierarchical database, relational database, such as a database created and maintained with software from, for example, Oracle® Corporation, Microsoft® Excel® file, Microsoft® Access® file, a solid state storage device, which can include an all flash array, a hybrid array, or a server-side product, enterprise storage, which can include online or cloud storage, or any other storage mechanism.

The data storage 108 can be a read-only memory, write-once read-multiple memory or read/write memory, e.g., RAM, ROM, and EEPROM, and the client device 105 can include one or more of these memories. A read-only memory can be factory programmable as read-only or one-time programmable. One-time programmability provides the opportunity to write once then read many times. A write once/read-multiple memory can be programmed at a point in time after the memory has left the factory. Once the memory is programmed, it cannot be rewritten, but it can be read many times. A read/write memory can be programmed and re-programed many times after leaving the factory. It can also be read many times.

Although depicted as single elements, it should be appreciated that according to one or more embodiments, the client device 105 can comprise a plurality of client devices 105. As shown in FIG. 1, the client device 105 can include various components. As used herein, the term "component" can be understood to refer to computer executable software, firmware, hardware, and/or various combinations thereof. It is noted there where a component is a software and/or firmware component, the component is configured to affect the hardware elements of an associated system. It is further noted that the components shown and described herein are intended as examples. The components can be combined, integrated, separated, or duplicated to support various applications. Also, a function described herein as being performed at a particular component can be performed at one or more other components and by one or more other devices instead of or in addition to the function performed at the particular component. Further, the components can be implemented across multiple devices or other components local or remote to one another. Additionally, the components can be moved from one device and added to another device, or can be included in both devices.

The client device 105 can be any device capable of communicating via, for example, Bluetooth technology, near field communication (NFC) technology, WiFi Direct technology, and/or the like. The client device 105 can be associated with a user and can be configured to execute various functions to transmit and receive user data (e.g., security questions, answers to security questions, card number, account type, account balance, account limits, budget data, recent transactions, and/or the like). For example, the client device 105 could be an iPhone, iPod, iPad, and/or Apple Watch from Apple® or other mobile device running Apple's iOS operating system, devices running Google's Android® operating system, including, for example, smartphones running the Android® operating system and other wearable mobile devices, such as Google Glass® or Samsung Galaxy® Gear Smartwatch, devices running Microsoft's Windows® Mobile operating system, and/or any other smartphone, smartwatch, tablet, or like device, which can include personal assistant devices incorporating systems, such as Alexa, Siri, Google Assistant, and Microsoft Cortana, including home assistant devices such as Amazon Echo, Google Home, and the like.

The client device 105 can include components to send and/or receive data for use in other components, such as a communication interface 107. The communication interface 107 can include various hardware and software components, such as, for example, a repeater, a microwave antenna, or another network access device capable of providing connectivity between network mediums. The communication interface 107 can also contain various software and/or hardware components to enable communication over the network 120. For example, the communication interface 107 can be capable of sending or receiving signals via the network 120. Moreover, the communication interface 107 can provide connectivity to one or more wired networks and can be capable of receiving signals on a first medium (such as a wired network) and transmitting the received signals on a second medium (such as a wireless network). One or more users can access the network 120 through one or more user devices 105 (using the various components of the one or more user devices 105) that can be communicatively coupled to the network 120.

Client device 105 can include a client driver 110. Client driver 110 can provide runtime support for application 106, and can facilitate application 106 transmitting and receiving data from cluster system 125. For example, if application requests data from cluster system 125, the client driver 110 can specify the address for the application to transmit client requests to the cluster system 125. Client driver 110 can provide a programming interface to control and manage lower level interfaces linked to the hardware of the client device 105.

In exemplary embodiments, client driver 110 can maintain node management data.

Client driver 110 can periodically transmit a data request to one or more nodes in a cluster system 125. The client driver 110 can periodically transmit data requests to the leader node and to the other nodes in the cluster system 125. In response to the data requests sent by the client driver, the leader node, (and any other nodes who were sent data requests) can transmit a reply. Client driver 110 can maintain node management data indicating the identity of each of the nodes in the cluster system (such as a name, and address of each of the nodes), a current status of each of the nodes (such as a responsive, and non-responsive status), a leader status of each of the nodes, a count pertaining to the number of times a nodes has not replied to data requests from the client driver, a response time of each of the plurality of nodes, indicating a time taken for each of nodes to reply to a data request from the client driver, and other information, such as other metrics pertaining to the performance of each of the plurality of nodes. Client driver 110 can ascertain the node management data from the replies received (or not received) from the nodes in the cluster system 125. If the client driver 110 determines the leader node is non-responsive (after one or more data request transmission sent thereto), the client driver 110 can reroute client requests to another node in the cluster system 125.

The client driver 110 can further maintain and manage a connection pool, which can contain data indicative of the connection between previous client requests and each of the individual nodes of the cluster system 125 that handled such client requests. The cluster system 125 can transmit information pertaining to the particular node in the cluster system 125 that has handled particular client requests in the past to client driver 110, so that the client driver 110 can maintain a current connection pool. The client driver 110 can also utilize information in the cluster management data (such as response time) to determine which node to route client requests to in the event that the leader node is non-responsive.

The client device 105 can also include various software components to facilitate the functionalities described herein, including an application processor (not shown in FIG. 1). For example, the client device 105 can include an operating system such as, for example, the iOS® operating system from Apple®, the Google® Android® operating system, and the Windows Mobile® operating system from Microsoft®. The client device 105 can also include, without limitation, software application(s) such as web browsing applications, email account applications, and mobile banking applications, an NFC application programming interface, and software to enable touch sensitive displays.

The system 100 can include one or more network 120. In some examples, network 120 can be one or more of a wireless network, a wired network or any combination of wireless network and wired network, and can be configured to connect to any one of components of system 100. In some examples, network 120 can include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 120 can include, without limitation, telephone lines, fiber optics, IEEE Ethernet 902.3, a wide area network, a wireless personal area network, a LAN, or a global network such as the Internet. In addition, network 120 can support an Internet network, a wireless communication network, a cellular network, or the like, or any combination thereof. Network 120 can further include one network, or any number of the exemplary types of networks mentioned above, operating as a stand-alone network or in cooperation with each other. Network 120 can utilize one or more protocols of one or more network elements to which they are communicatively coupled. Network 120 can translate to or from other protocols to one or more protocols of network devices. Although network 120 is depicted as a single network, it should be appreciated that according to one or more examples, network 120 can comprise a plurality of interconnected networks, such as, for example, the Internet, a service provider's network, a cable television network, corporate networks, such as credit card association networks, and home networks.

Figure 2:
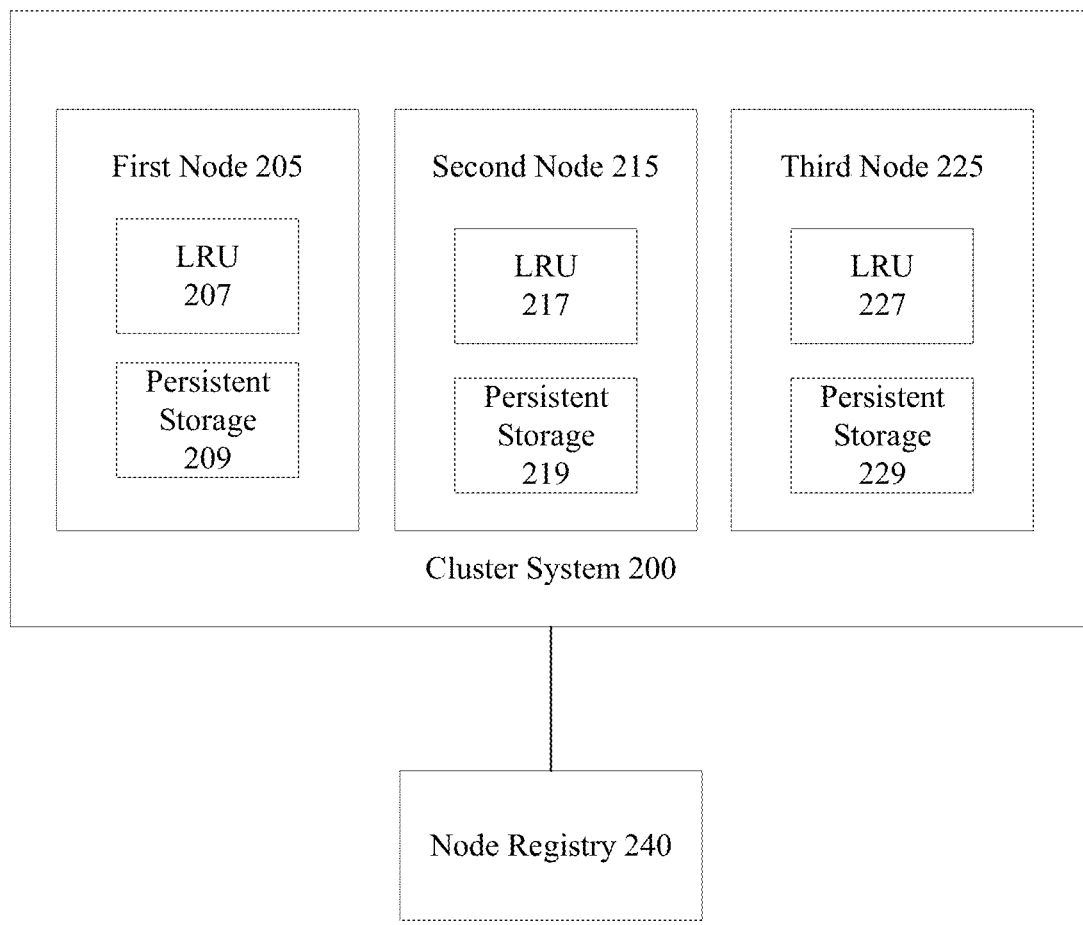
FIG. 2 illustrates an exemplary cluster system.

System 100 can further comprise one or more node registries 130, which is described in more detail with respect to FIG. 2. Node registry 130 can be provided in the form of a database or server, such as a database analogous to the database 140 described herein, or a server analogous to the server 135 described herein. Node registry 130 can function as a discovery server which can provide information about one or more nodes in the cluster system 125 to the other nodes in the cluster system 125. In exemplary embodiments node registry can provide information as to when each of the nodes in the cluster system 125 initialized or registered. Each of the nodes in the cluster system 125 can register with the node registry 130 whenever the node initializes.

System 100 can optionally comprise one or more servers 135. In some examples, the server 135 can include one or more processors 137 coupled to memory 139. The server 135 can be configured as a central system, server or platform to control and call various data at different times to execute a plurality of workflow actions. The server 135 can be configured to connect to the cluster system 125. One or more nodes in the cluster system 125 can retrieve or store data to, write to, or otherwise access data from the server 135. The server 135 can be a dedicated server computer, such as bladed servers, or can be personal computers, laptop computers, notebook computers, palm top computers, network computers, mobile devices, wearable devices, or any processor-controlled device capable of supporting the system 100. While FIG. 1 illustrates a single server 135, it is understood that other embodiments can use multiple servers or multiple computer systems as necessary or desired to support the users and can also use back-up or redundant servers to prevent network downtime in the event of a failure of a particular server.

While FIG. 1 illustrates a server 135, it is understood that other embodiments can use multiple servers or multiple computer systems as necessary or desired to support the users and can also use back-up or redundant servers to prevent network downtime in the event of a failure of a particular server.

The server 135 can include a processor 137. The processor 137 can be, for example, one or more microprocessors. The processor 137 can include processing circuitry, which can contain additional components, including additional processors, memories, error and parity/CRC checkers, data encoders, anti-collision algorithms, controllers, command decoders, security primitives and tamper-proofing hardware, as necessary to perform the functions described herein.

The server 135 can include an application comprising instructions for execution thereon (not shown). For example, the application can reside in memory 139 of server 135 and can comprise instructions for execution on the server 135.

System 100 can also optionally include one or more databases 140. The database 140 can comprise a relational database, a non-relational database, or other database implementations, and any combination thereof, including a plurality of relational databases and non-relational databases. In some examples, the database 140 can comprise a desktop database, a mobile database, or an in-memory database. The database 140 can be in data communication with one or more nodes in the cluster system 125. For example, one or more nodes of the cluster system 125 can be configured to retrieve or store data from, write data to, or otherwise access data from the database 140 via one or more nodes of the cluster system 125.

In some examples, exemplary procedures in accordance with the present disclosure described herein can be performed by a processing arrangement and/or a computing arrangement (e.g., computer hardware arrangement). Such processing/computing arrangement can be, for example entirely or a part of, or include, but not limited to, a computer/processor that can include, for example one or more microprocessors, and use instructions stored on a computer-accessible medium (e.g., RAM, ROM, hard drive, or other storage device).

In some examples, a computer-accessible medium (e.g., as described herein above, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein.

Reference is now made to FIG. 2 which illustrates an exemplary cluster system 200. FIG. 2 may reference the same or similar components, and data as the other figures set forth herein. Cluster system 200 can be the same as cluster system 125 illustrated in FIG. 1. Cluster system 200 can include a plurality of nodes, such as first node 205, second node 210, and third node 215. First node 205, second node 210, and third node 215 and any additional nodes in cluster system 200 can be communicatively coupled to another in the cluster system 200 by, for example, a a cluster bus, a shared network or other configuration connecting the components in the cluster to one another. Nodes can be configured to perform shared tasks requested by a client device (such as client device 105 described in connection with FIG. 1). Each node in the cluster system (such as first node 205, second node 210, and third node 215) can be machines, such as virtual machines or in alternative embodiments, one or more nodes can be a distinct physical machines.

Each node can include an in-memory LRU component and a persistent storage component. For example, first node 205 can include in-memory LRU component 207 and a persistent storage component 209, second node 215 can include in-memory LRU component 217 and a persistent storage component 219, third node 225 can include in-memory LRU component 227 and a persistent storage component 229.

The persistent storage component can be in the form of non-volatile memory, such as, but not limited to, a non-volatile express memory (NVMe) disk. In exemplary embodiments persistent storage can utilize, for example, RocksDB.

The in-memory LRU component can be provided in any other form of volatile memory, including random access memory (RAM), and Dynamic RAM (DRAM). volatile memory.

Each node can further include an application comprising instructions for execution thereon (not shown). For example, the application can reside in one of the LRU component or persistent storage component in the nodes and can comprise instructions for execution on the node. Each node can also include a communication interface (not shown), which can tains contain various software and/or hardware components to enable communication to other nodes and to other components (such as client devices, databases, servers, and node registries) over external networks.

The node registry 240 can be a discovery server, which stores node data pertaining to the cluster system 200. Node registry 240 can be a database or a server (such as a virtual machine provided externally to the cluster system over a network. For example, each node in the cluster system can be communicatively coupled through an internal network, such as through a cluster bus or LAN network, while node registry 240 can be communicatively coupled to the cluster system 200 through an external network, such as a WAN network. Node registry 240 can store the following node data for each node in the cluster system that registers with it: IP address, registration time, ID (or an indication of the name of a particular node), and node status. The node status can indicate if a node is in a startup state (such as when a node is initializing from an offline state), shutting down state (such as when a node is transition from an online state to an offline state), an offline state, an online state, or a non-responsive state. In addition the node registry 240 can be configured to transmit a health check transmission to each node in the cluster system 200 to determine a current node status of each of the nodes in the cluster system. Based on a reply received (or not received) from the health check transmission, the node registry can appropriately update a status one or more nodes in the node data indicating the state of the node.

When a node in the cluster system initially startups or initializes (and is able to communicate with node registry 240 via its communication interface) the node can be configured to transmit a registration transmission with the node registry 240.

Each of the nodes can be configured to register with the node registry 240 upon manually being turned, or via automatic processes. For example, one or nodes in the cluster system can be configured to automatically startup or initialize in response to another node in the cluster system being determined to be non-responsive or offline. To register with the node registry, a node of the cluster system can transmit one or more messages including data indicative of the node's identity (node ID), node IP address, node status, and registration time.

Figure 3:
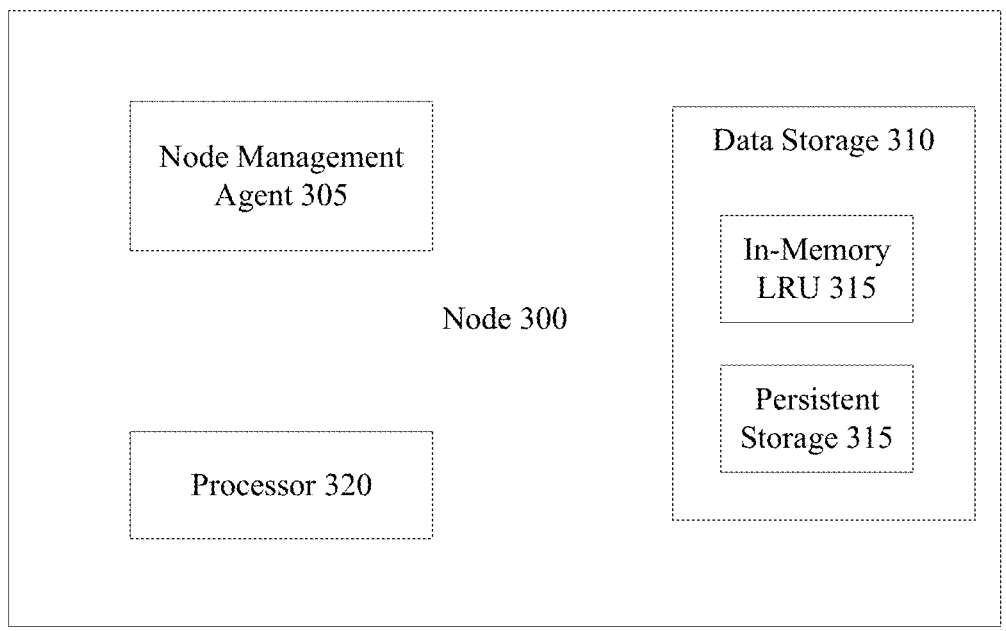
FIG. 3 illustrates an exemplary node.

Reference is now made to FIG. 3 which illustrates an exemplary node 300. FIG. 3 may reference the same or similar components, and data as the other figures set forth herein. Node 300 can have the same components as first node 205, second node 210, and third node 215 depicted in FIG. 2. Node 300 can include node management agent 305, data storage 310, and processor 320. Data storage 310 can include an in-memory least recently used (LRU) component 315 or main memory, and persistent storage 318. Persistent storage 318 can be the same as the persistent storage component described in connection to FIG. 2. Data can be stored in in-memory LRU component 315 in volatile memory so the node 300 can quickly access data, while data can be stored in persistent storage 318 as non-volatile memory, such as a non-volatile memory express memory (NVMe) disk. In in-memory LRU component 315 can be any other form of volatile memory, including random access memory (RAM), and Dynamic RAM (DRAM).

All of the data in the cluster system can be saved in a persistent storage component of each of the nodes. Thus, each node in the cluster system can access 100% of the data available in the cluster system, even if such data is not currently stored in the in-memory LRU component of a particular nodes. In exemplary embodiments, only data associated with particular data slots allocated to a particular node in the cluster system is stored in the in-memory LRU component 315 of that node.

Data slots can be used to allocate the storage of keys and data associated with the keys among the nodes in the cluster system. A fixed number of data slots can be distributed amongst the nodes in the cluster system at any one time. For example, cluster system can be similar to a Redis cluster containing 16,384 data slots (or hash slots). A particular data slot value (e.g. "8,450") can be derived by performing a hash and modulo function on a key. The hash function can take as an input the key (which can be a string of any size), compute and return a particular hash value (which is a value with a fixed length). The hash function can be, for example, a CRC-16 hash function. A modulo function using the total number of data slots in the cluster system, can thereafter be performed on the hash value to obtain the slot value of a particular key.

A client driver of the client device can perform the hashing and modulo function on the key in the client request, and return the data slot value of one of the plurality of data slots in the cluster system. In this manner, the client driver can determine a particular node to route client requests to by deriving the data slot value from the key contained in the client request and by knowing the data slots allocated to each node in the cluster network and the number of data slots in the cluster. The node allocated to the slot value associated with the key contained in the client request can then be routed with that particular client request. By storing data associated with the data slots allocated to the node in the in-memory LRU component 315, the particular node can handle the client request more quickly than a node handling the client request that's required to access data associated with the client request through persistent storage.

For example, a key can be "Color," with a slot value "10100," and the data associated with the key can include a string of different colors, e.g., "Blue, Green, Red, Yellow.") The associated data can be, for example, a string, list, set, hash, bit array, stream or another type of data structure. The key and the data associated with the key can be saved in the in-memory LRU component 315 of a third node in a cluster system (as well as the persistent storage component of each node in the cluster network) which is allocated to the slot value corresponding to the key. If a client request includes the key "User1Profile," a client driver of the client device can determine an associated slot value (10100) of the key using a hashing and modulo function, and then route the client request to the third node to handle the request). The third node can then quickly and efficiently handle the client request as data associated with the key, "Color" as the data associated with the key is already stored in the in-memory LRU of the third node.

The client driver must know the data slot topology of the cluster system, i.e. how the data slots are allocated across each of the nodes in the cluster system, in order to route the client requests to the appropriate node. In exemplary embodiments, the client driver can receive the data slot topology of the cluster system from the leader node using the systems and methods described herein.

By distributing the data slots across a plurality of nodes in the cluster system, the client requests can quickly and efficiently be handled, as each client request can be handled by a node storing data requested in its in-memory LRU component rather than having to retrieve such data from persistent storage.

Each node in the cluster system can further include a node management agent 305. Node management agent 305 can be an application executed by the processor 320. The node management agent 305 can be configured to perform the processes and functions described herein with respect to the node associated therewith. For example node management agent can be responsible for all or part of the following functions of the node 300: transmitting and receiving data to and from other nodes, the node registry, client devices (including associated client drivers), external networks, databases and servers, and internal data storage (including the in-memory LRU and persistent storage components), reading and writing such data into various components, processing and monitoring such data and performing other functions described herein.

The node 300 can also include at least one processor 320, which can be a central processing unit (CPU), which can be configured to execute computer program instructions to perform various processes and methods. The at least one CPU can comprise several processors, a single processor, or a single device having multiple processors. A single CPU can be shared among a plurality of nodes in the cluster system. The node 300 can also include a network interface (not shown), such as the network interface described in connection with FIG. 2.

Figure 4:
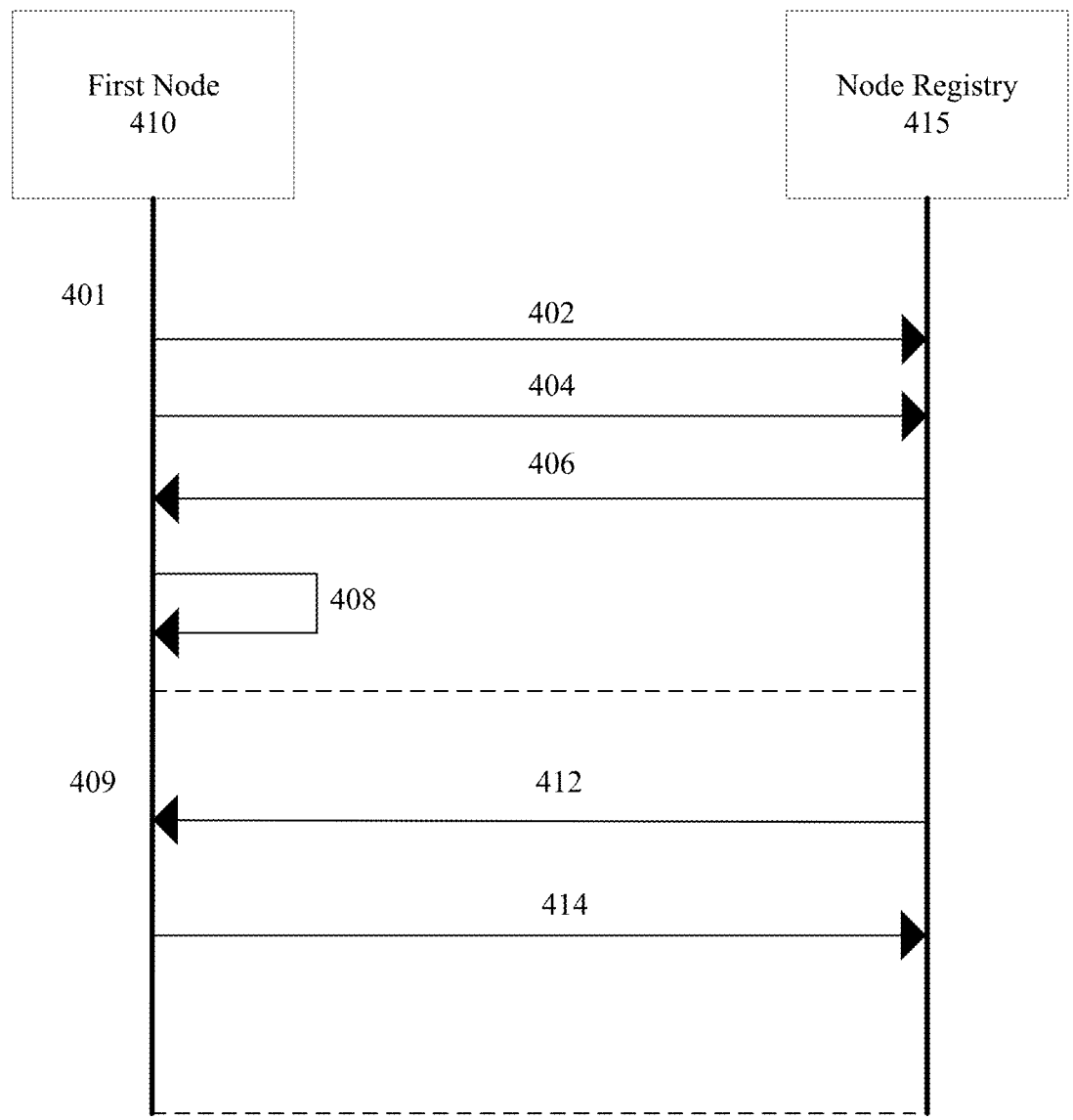
FIG. 4 is a sequence diagram illustrating an exemplary cluster leader node election process.

Reference is now made to FIG. 4, which is a sequence diagram illustrating an exemplary cluster leader node election process and an exemplary health check process. FIG. 4 may reference the same or similar components, and data as the other figures set forth herein.

The exemplary processes illustrated in FIG. 4 can involve a cluster system including at least one node, such as first node 410, and a node registry 415 provided as an external database or server. The exemplary process can involve more than one node and/or node registry.

Reference 401 refers to an exemplary cluster leader node election process. At sequence 402 when the first node 410 initially startups or initializes the first node can transmit a registration request to node registry 415 of the cluster system. The node registry 415 can update node data in response to receiving the node registration request. For example, node registry can add or update node data to reflect the node ID, registration time, and node status of the first node 410. Such data can be included in the node registration request, or can be communicated to the node registry 415 in subsequent transmissions to the node registry from the first node 410.

At sequence step 404 first node 410 can transmit a request to node registry 415 to receive node data.

At sequence step 406, node registry 415 can transmit node data to the first node 410. In some embodiments, the transmitted node data can be in the form a chronological list, listing the ID, IP address, and node status, and registration time of each of the nodes based on the registration time(s) of each of the nodes.

At step 408 first node 410 can identify a leader node based on the node data. First node 410 can, for example, determine the leader node from the node data by identifying a node with an online status having the earliest registration time.

If first node 410 determines that it is the leader node, first node 410 can alter the fully qualified domain name (FQDN) associated with the cluster system to its own IP address. A client driver only knowing only a hostname (or partially qualified domain name) of the cluster system, can thus readily communicate with the leader node as its request sent to the hostname of the cluster system will be resolved to the address of the leader node via a domain name server.

Reference 409 refers to an exemplary health check process. Node registry 415 can be configured to transmit a health check transmission to each node in the cluster system to determine a current node status of each of the nodes. At sequence step 412, for example, node registry can transmit a health check transmission to a first node 410 of the cluster system. At step 414, based on a reply received (or not received) from the health check transmission, the node registry 415 can appropriately update the current node status of the first node 410 in node data. For example, if the first node 410 successfully transmits a reply to the node registry 415, the node registry 415 can designate the first node 410 as online in node data. If first node fails 410 to respond to the health check transmission, the node registry 415 can designate the first node 410 as offline in node data. If the first node 410 continues to transmit data to the node registry 415, but fails to respond to the health check transmission, or otherwise provides a transmission to the node registry 415 indicating hardware or software issues, the node registry 415 can designate the first node 410 as non-responsive. The node registry can periodically transmit health check transmissions to each of the nodes in the cluster system, on a regular interval, such as once every 5 seconds.

Figure 5:
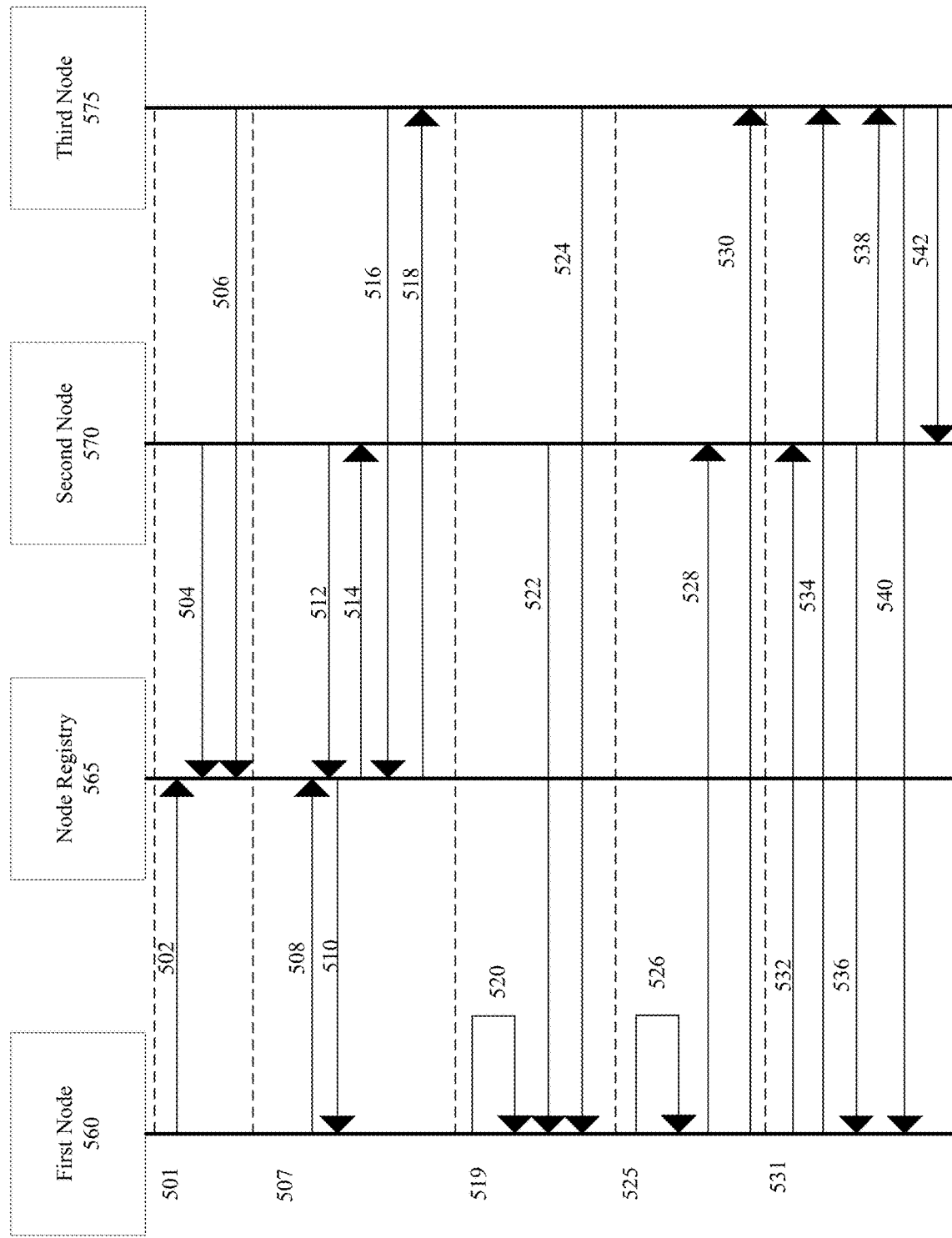
FIG. 5 is a sequence diagram illustrating exemplary clustering and node information sharing processes.

Reference is now made to FIG. 5, which is a sequence diagram illustrating exemplary clustering and node information sharing processes. FIG. 5 may reference the same or similar components, and data as the other figures set forth herein. The processes described in FIG. 5 can involve a cluster system including a first node 560, a second node 570, and a third node 575, and an external node registry 565. The processes illustrated with respect to FIG. 5 however, are applicable to systems involving more nodes and/or node registries.

Reference 501 refers to an exemplary node registration process which contains similar to steps to the process described with respect to FIG. 4. At sequence step 502, first node 560 can transmit a registration request to node registry 565 at a first, earliest time. At sequence step 504, second node 570 can transmit a registration request to node registry 565 at a second time which is later than the first time. At sequence step 506, third node 575 can transmit a registration request to node registry 565 at a third time which is later than the second time. The node registry 565 can receive all such registration requests and update node data in real time as the registration requests are received. The node data can, for example, indicate the ID, address, node status, and a registration time (based on when the registration request was received) of each of the first node 560, second node 570, and third node.

Reference 507 refers to an exemplary leader node determination process which contains similar steps to the process described with respect to FIG. 4. In sequence step 506 first node 560 can transmit a request to the node registry 565 to receive node data. At sequence step 508, node registry 565 can return node data to the first node 560, indicating which of the nodes already registered with the node registry 565 was first to register (which is the first node 560 in the example illustrated in FIG. 5). The first node 560 can determine that it is the leader node based on the received node data as it is the earliest registered node in the node data. Because the first node is the leader node it can alter the FQDN of the cluster system so that all client requests directed to the hostname of the cluster network are resolved to the address of the leader node.

At sequence step 510, second node 570 can transmit a request to the node registry 565 to receive node data. At sequence 512, the second node 570 can determine that the first node 560 is the leader node because the received node data indicates that the first node has the earliest registration time and is online.

At sequence step 514, the third node 575 can transmit a request to the node registry 565 to receive node data. At sequence 516, the third node 575 can determine that the first node 560 is the leader node because the received node data indicates that the first node has the earliest registration time and is online.

In the exemplary leader node determination process 507 the first, second, and third nodes can periodically transmit requests to the node registry 565 to receive current node data, receive the current node data from the node registry 565, and determine the current leader node based on the current node data. In certain embodiments, this process can occur approximately once every sixty seconds. The sequence steps 508, 512, and 516, corresponding to the first, second, and third nodes transmitting a request to the node registry 565 to receive a current node data, can occur at approximately the same time, and the node registry 565 can transmit node data to each of the nodes in the cluster system (corresponding to sequence steps 510, 514, and 518) at approximately the same time. Alternatively, the node registry 565 can be configured to transmit node data to a particular node whenever it receives requests from that node.

Reference 519 refers to an exemplary cluster initialization process. At sequence step 520 after first node 560 has determined the leader node, which in the illustrative example in FIG. 5 is the first node 560, the first node 560 designates itself as the leader of the cluster system.

In sequence step 522 after the second node 570 has determined the leader node, which in the illustrative example in FIG. 5 is the first node 560, the second node 570 joins the cluster system by providing a cluster password to the leader node (the first node 560) so that the leader node can authenticate the second node 570. An authentication confirmation can be transmitted from the leader node to the second node 570 in response.

In sequence step 524 after the third node 575 has determined the leader node, which in the illustrative example in FIG. 5 is the first node 560, the third node 575 joins the cluster by providing a cluster password to the leader node (the first node 560) so that the leader node can authenticate the third node 575. An authentication confirmation can be transmitted from the leader node to the third node 575 in response.

Reference 525 illustrates an exemplary data slot allocation process. In the exemplary data slot allocation process the leader node can determine the allocation of data slots for each of the nodes in the cluster system based on the responsiveness of the nodes. During this process, all of the data slots in the cluster node are allocated among the nodes in cluster system. If only one node is present cluster system, for example, that node must contain of the data slots of the cluster system. The leader node can determine to adjust the allocation of the data slots amongst the cluster nodes in the cluster system because of, for example, failure of one or more nodes in the cluster system, performance related issues of one or more nodes in the cluster system, and/or alterations in the volume or other characteristics of client requests (to the extent that such alterations render a particular node ineffective).

In sequence step 526 the leader node (which is first node 560 in the example shown in FIG. 5) can initially allocate or adjust the allocation of the data slots to the first node 560. In certain embodiments the leader node can determine to allocate no data slots to the first node 560 when it has determined that, for example, the first node 560 is the leader node. In can be beneficial in certain situations to have no data slots allocated to the leader node so that all of the processing capabilities of the leader node are directed to performing tasks in which the leader node is solely responsible for, such as, for example, allocating data slots across the nodes in the cluster system, and monitoring the performance of the other nodes in the cluster system. In other embodiments, (including embodiments where only one node is present in the cluster system) the leader node can allocate one or more data slots to itself. Such a configuration can be beneficial when the leader node has enough processing capability to perform both its function as a leader node and as a non-leader node, or there are not enough available nodes.

In sequence step 528 the leader node can initially allocate or adjust the allocation of the data slots in the second node 570. The leader node can also transmit a health check to the second node 570, and determine a node status of the second node 570 based on a reply from the second node 570. The node status can indicate if a node is in a startup state (such as when a node is initializing from an offline state), shutting down state (such as when a node is transition from an online state to an offline state), an offline state, an online state, or a non-responsive state. The leader node can determine to adjust the allocation of data slots according to the node status of the second node 570 and of the other nodes in the cluster system.

In sequence step 530 the leader node can initially allocate or adjust the allocation of the data slots in the third node 575. The leader node can also transmit a health check to the third node 575, and determine a node status of the third node 575 based on a reply from the third node 575. The leader node can determine to adjust the allocation of data slots according to the node status of the third node 575 and of the other nodes in the cluster system.

When the leader node initially allocates or adjusts the allocation of data slots of a particular node in the cluster network, the node can pull data associated with the data slots now allocated thereto into its in-memory LRU that is not already present and/or current. The data associated with the now allocated data slots can be obtained from the persistent storage of the cluster network. The first node can also perform this same process in sequence step 526 to the extent data slots are allocated to it with respect to pulling data associated with the data slots allocated thereto.

The exemplary data slot allocation process can be performed periodically, or can be performed on an ad hoc basis by the leader node. As the process of loading data into the in-memory LRU can be time consuming and computationally costly, the alteration of the allocation of data slots in the cluster is only performed when needed.

Reference 531 refers to an exemplary updating process in the cluster system. In the exemplary updating process each of the nodes in the cluster system can push any updates to the data associated with the data slots allocated to the respective node to the other nodes in the cluster system so that the other nodes can replicate the updates into their persistent storage. In this manner, each node in the cluster system can actively maintain all of the data associated with each data slot in the cluster system in its persistent storage At sequence step 532 first node 560 can push any updates to the data associated with the data slots allocated to the first node 560 to the second node 570. Second node 570 can thereafter replicate the updates to its persistent storage component. At sequence step 534 first node 560 can push any updates to the data associated with the data slots allocated to the first node 560 to the third node 575. Third node 575 can thereafter replicate the updates to its persistent storage component.

At sequence step 536 second node 570 can push any updates to the data associated with the data slots allocated to the second node 570 to the first node 560. First node 560 can thereafter replicate the updates to its persistent storage component. At sequence step 538 second node 570 can push any updates to the data associated with the data slots allocated to the second node 570 to the third node 575. Third node 575 can thereafter replicate the updates to its persistent storage component.

At sequence step 540 third node 575 can push any updates to the data associated with the data slots allocated to the third node 575 to the first node 560. First node 560 can thereafter replicate the updates to its persistent storage component. At sequence step 542 third node 575 can push any updates to the data associated with the data slots allocated to the third node 575 to the second node 570. Second node 570 can thereafter replicate the updates to its persistent storage component.

By continuously performing the exemplary updating process 531, it can be ensured that all of the cluster system data accessible by a client device is backed up in the persistent storage components of each of the nodes in the cluster system. In the event of failure of one or more of the nodes in the cluster, another of the nodes in the cluster systems can access any data associated with data slots allocated to the failed node.

In an alternative updating process whenever data is written into one of the nodes in the cluster by a client device, the data which is written can be propagated to other nodes in the cluster. In this manner, the other nodes can store the newly written data into each of their persistent memory components. Unlike the exemplary updating process, in the alterative updating process, an inter-mode communication in the cluster is required.

In certain embodiments the exemplary updating process is performed on a periodic basis and is performed at a greater frequency than the leader node determination process 507 and data slot allocation process 525. In a particular embodiment, the exemplary updating process is performed approximately once every ten seconds.

In certain embodiments after one or more data slot has been reallocated away from one node (which has not been determined to be not responsive), that node can remove data associated with the data slots which have reallocated away therefrom from its in-memory LRU component. Such a feature can ensure that the in-memory of the LRU does not run out of space.

Figure 6:
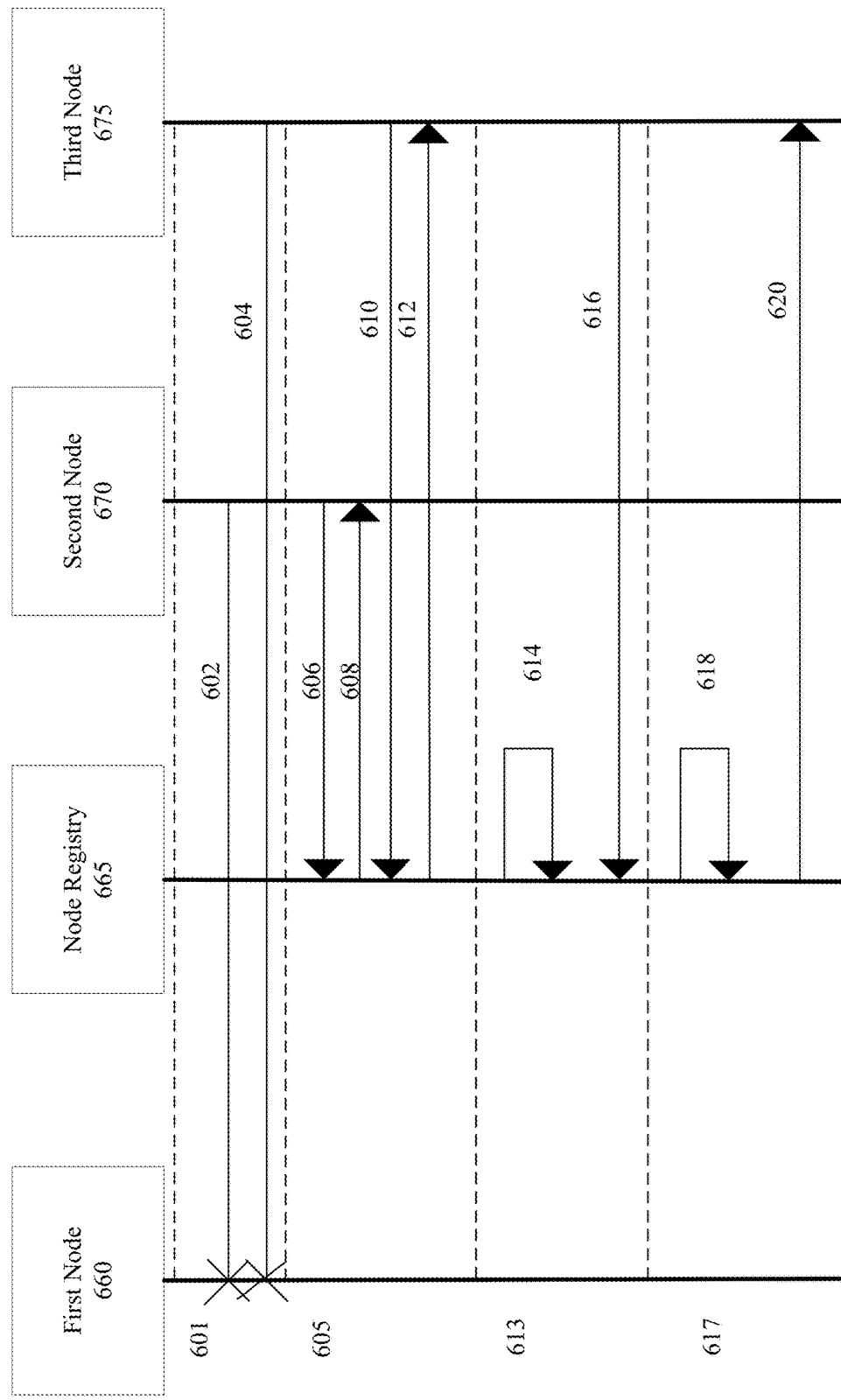
FIG. 6 is a sequence diagram illustrating exemplary node failure processes in the exemplary cluster system.

FIG. 6 is a sequence diagram illustrating exemplary node failure processes in the exemplary cluster system. FIG. 6 may reference the same or similar components, and data as the other figures set forth herein.

The exemplary node failure process can involve a cluster system including a first node 660, a second node 670, and a third node 675 and an external node registry 665. The processes illustrated with respect to FIG. 6 however, are applicable to systems involving more nodes and/or node registries.

Reference 601 refers to an exemplary cluster initialization process during leader node failure. In the exemplary cluster initialization process 601, the first node 660 had previously been determined by the second and third nodes in the cluster network to be the leader node (via a previous leader node determination process).

At sequence step 602 the second node 670 can attempt to join the cluster by providing a cluster password to the leader node (the first node) and can expect an authentication confirmation in response thereto after a first predetermined period of time, or the second node 670 can otherwise expect a response from leader node, and fail to receive a response from leader node after the first predetermined period of time. After the second node 670 fails to receive a response from the leader node (the first node) after the first predetermined period of time, the second node can determine that the leader node at the time (the first node) has failed or is otherwise not responsive. The second node 670 can store in data storage data indicative of the failure of the first node.

At sequence step 604 the third node 675 can attempt to join the cluster by providing a cluster password to the leader node (the first node) and can expect an authentication confirmation in response thereto after the first predetermined period of time, or the third node 675 can otherwise expect a response from leader node, and fail to receive a response from the leader node after the first predetermined period of time. After the third node 675 fails to receive a response from the leader node (the first node) after the first predetermined period of time, the third node 675 can determine that the leader node at the time (the first node) has failed or is otherwise not responsive. The third node 675 can store in data storage data indicative of the failure of the first node.

Reference 605 refers to an exemplary leader node determination process that can be triggered to be ran after a second predetermined period after one or more of the nodes in the cluster failed to receive a response from the leader node (as illustrated in exemplary cluster initialization process 601).

In some embodiments, the first and second period of time can be the same, and in other embodiments, they can be different. The second period of time can be greater than the first period of time in some embodiments if the leader node has had a history of not being responsive, and then reconnecting shortly thereafter. The first and second period of time can be adjusted by a user or can be adjusted based on parameters of the cluster system.

In alternative embodiments, the exemplary leader node determination process can be triggered due to a normal cycle of a leader node determination process (such as the exemplary leader node determination process 507 described in connection with FIG. 5).

In sequence step 606 in the exemplary leader node determination process 605, the second node 670 can transmit a request the node registry 665 to receive current node data. At step 608 second node 670 can receive current node data from the node registry 665 and determine a leader node based on the current node data. In the example in FIG. 6, although the second node 670 ascertains that the first node 660 in the cluster system has an earliest registration time of the nodes in the node data, the second node nevertheless determines that it is the leader node because the first node 660 is in an offline or nonresponsive state and the second node 670 has the next earliest registration time of the nodes in the node data.

In sequence step 610 in the exemplary leader node determination process 605, the third node 675 can transmit a request the node registry 665 to receive current node data. At step 612 third node 675 can receive current node data from the node registry 665 and determine a leader node based on the node data. In the example in FIG. 6, the third node 675 determines that the second node 670 is the leader node based on the node data because the second node is has the earliest registration time of the online nodes.

Reference 613 refers to an exemplary data slot allocation process after leader node failure. After a new leader node has been determined (i.e. the second node 670 in FIG. 6), the new leader can reallocate any slots that were allocated the previous leader node (i.e. the first node 660 in FIG. 6) to the remaining healthy nodes in the cluster network. For example, the first node could have previously had data slots 0-5460 allocated to it. At sequence step 614, for example, the leader node (the second node) can allocate data slots 0-2730 that were previously allocated to the first node 660 to itself. After the data slots have been reallocated to the second node 670 from the first node 660, the second node 670 can replicate data associated with the newly allocated data slots into its in-memory LRU component. The data associated with the newly allocated data slots can be retrieved from the persistent storage component of the second node 670.

At sequence step 616 the leader node can allocate the remaining portion of the data slots previously allocated to the first node (data slots 2731-5460) to the third node. After the data slots have been reallocated to the third node 675 from the first node 660, the third node 675 can replicate data associated with the newly allocated data slots into its in-memory LRU component. The data associated with the newly allocated data slots can be retrieved from the persistent storage component of the third node 675.

Figure 7:
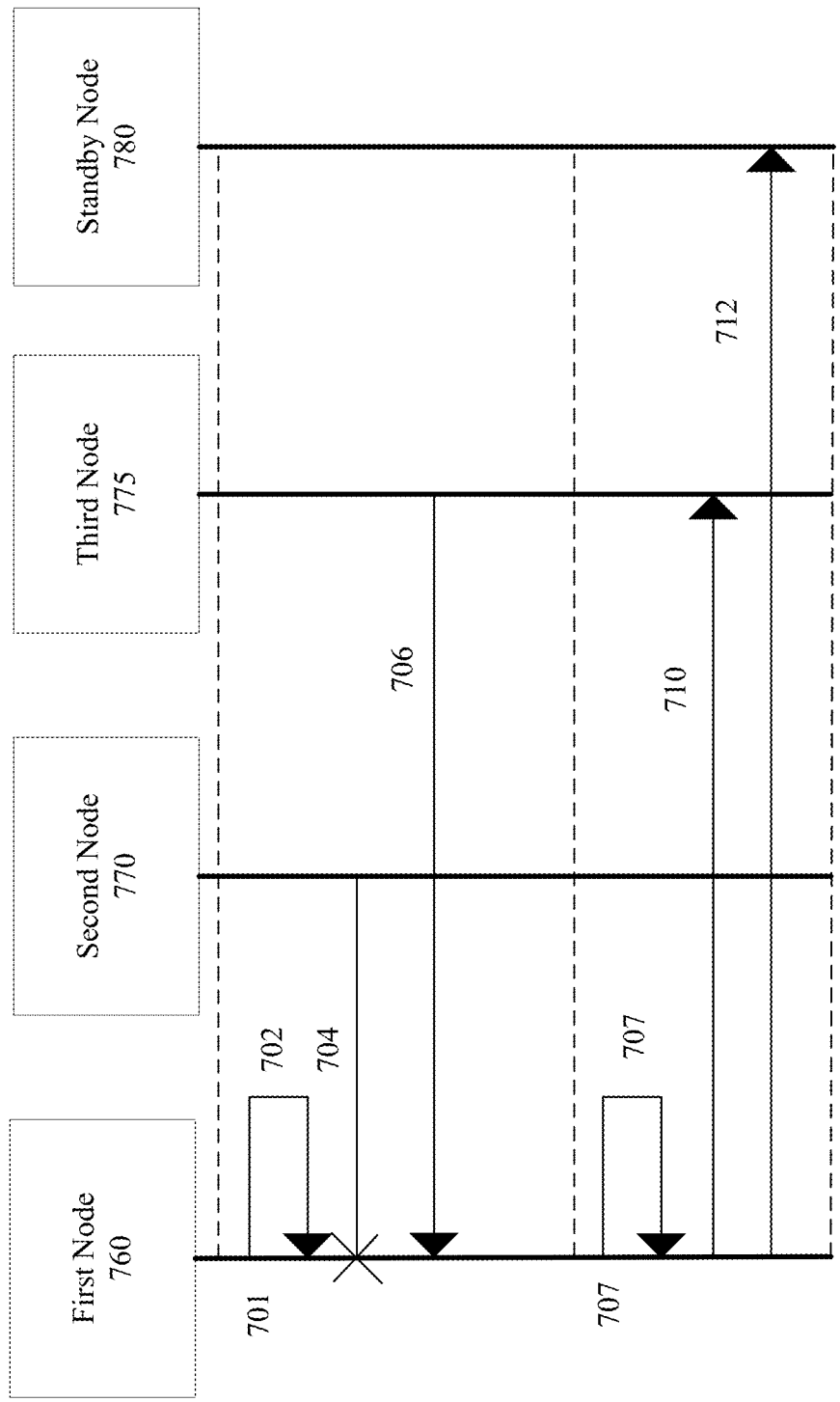
FIG. 7 is a sequence diagram illustrating exemplary non-leader node failure processes in the exemplary cluster system.

FIG. 7 is a sequence diagram illustrating exemplary non-leader node failure processes in the exemplary cluster system. FIG. 7 may reference the same or similar components, and data as the other figures set forth herein. The exemplary node failure process can involve a cluster system including a first node 760, a second node 770, a third node 775, and a standby node 780. The processes illustrated with respect to FIG. 7 however, are applicable to systems involving more nodes and/or other components.

Reference 701 refers to an exemplary cluster initialization process during non-leader node failure. In the system associated with the exemplary cluster initialization process 701 in FIG. 7, the first node 760 can have previously been determined by each of the nodes in the cluster system to be the leader node, and first, second, and third nodes can have previously have had all of the data slots in the cluster system allocated amongst each other.

In sequence step 702, the first node 760, as the leader node. At sequence step 704, the second node 770 does not provide a cluster password to the leader node, the first node, because, for example, the second node has an internal error or some other failure. If the second node 770 does not provide a cluster password to the leader node after a predetermined period of time, the leader node can determine that the second node is not responsive and no longer an available in the cluster system. In sequence step 706 the third node can provide a cluster password to the leader node so that the leader node can authenticate the third node and recognize and can verify it is responsive.

In alternative embodiments, the leader node can determine that one or more of the nodes in the cluster system are not responsive when the leader node fails to receive an expected transmission from the one or more nodes after a predetermined period of time.

Reference 707 refers to an exemplary data slot allocation process during non-leader node failure. In sequence step 708, the leader node (the first node 760) can reallocate data slots previously allocated to the second node 770 to itself. Thereafter, the leader node can load data associated with the newly allocated data slots into its in-memory LRU component from its persistent storage component. In sequence step 710, the leader node can reallocate data slots previously allocated to the second node 770 to the third node 775. Thereafter, the third node 775 can load data associated with the newly allocated data slots into its in memory LRU component from persistent storage.

In sequence step 712, the leader node can allocate data slots previously allocated to second node 770 to standby node 780. Standby node 780 can be a dedicated node that initially registers with the node registry but is not initially allocated with any data slots. In some embodiments, the persistent storage component of the standby node 780 can be consistently updated with the data associated with all of the data slots in the cluster system, just as the other nodes in the cluster system. Alternatively, upon standby node 780 being activated it can load data from the persistent storage of one of the active nodes into its persistent storage, and/or in memory LRU component.

In the event one of the active nodes in the cluster system fails, the standby node can already be initialized by the leader node, and can load data associated with the data slots allocated to it into its in-memory LRU component. While the replacement node starts up and loads data into its in-memory LRU component, or persistent storage, other nodes in the cluster system can handle client request by utilizing persistent storage when handling client requests pertaining to the data slots of a failed node.

After the leader node allocates data slots to the standby node, a new standby node can be automatically launched. In some embodiments, the new standby node can retrieve and store data associated with each of the data slots in the cluster system into its persistent storage even before it is activated by the leader node.

As set forth herein, exemplary embodiments of the present disclosure offers significant benefits over conventional systems. Compared to conventional systems, exemplary embodiments can mitigate the impact of node failure in multi node cluster systems, and thus decrease the read and write time, and latency time caused be increasing traffic achieved during deployment.

Figure 8:
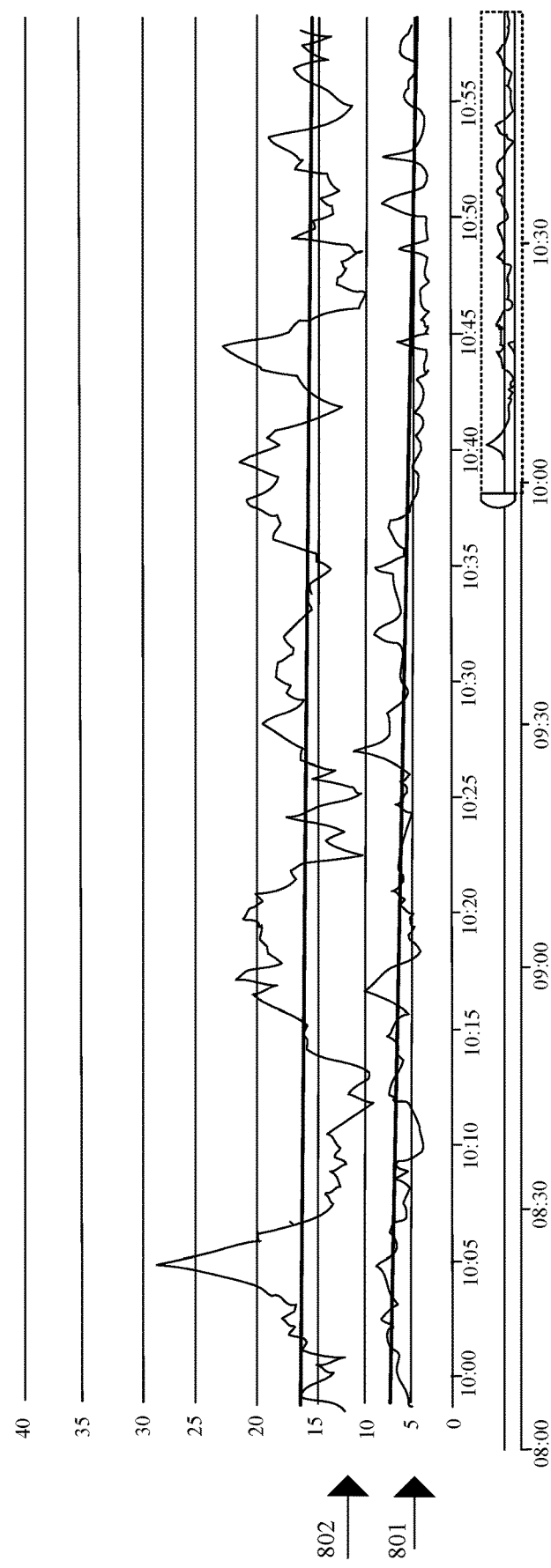
FIG. 8 illustrates a comparison between the read/write time of a conventional cluster system to the cluster system of exemplary embodiments.

FIG. 8 illustrates a comparison between the read/write time of a conventional cluster system (represented by reference 802) to the cluster system of exemplary embodiments described herein (represented by reference 801). In FIG. 8, the unit of measurement of the y axis is milliseconds, and the unit of measurement of the x axis is half hours. The average read/write time, as well as the maximum and minimum read and write time, over a period of hours is greatly reduced utilizing the cluster system described in exemplary embodiments compared to conventional approaches.

Figure 9:
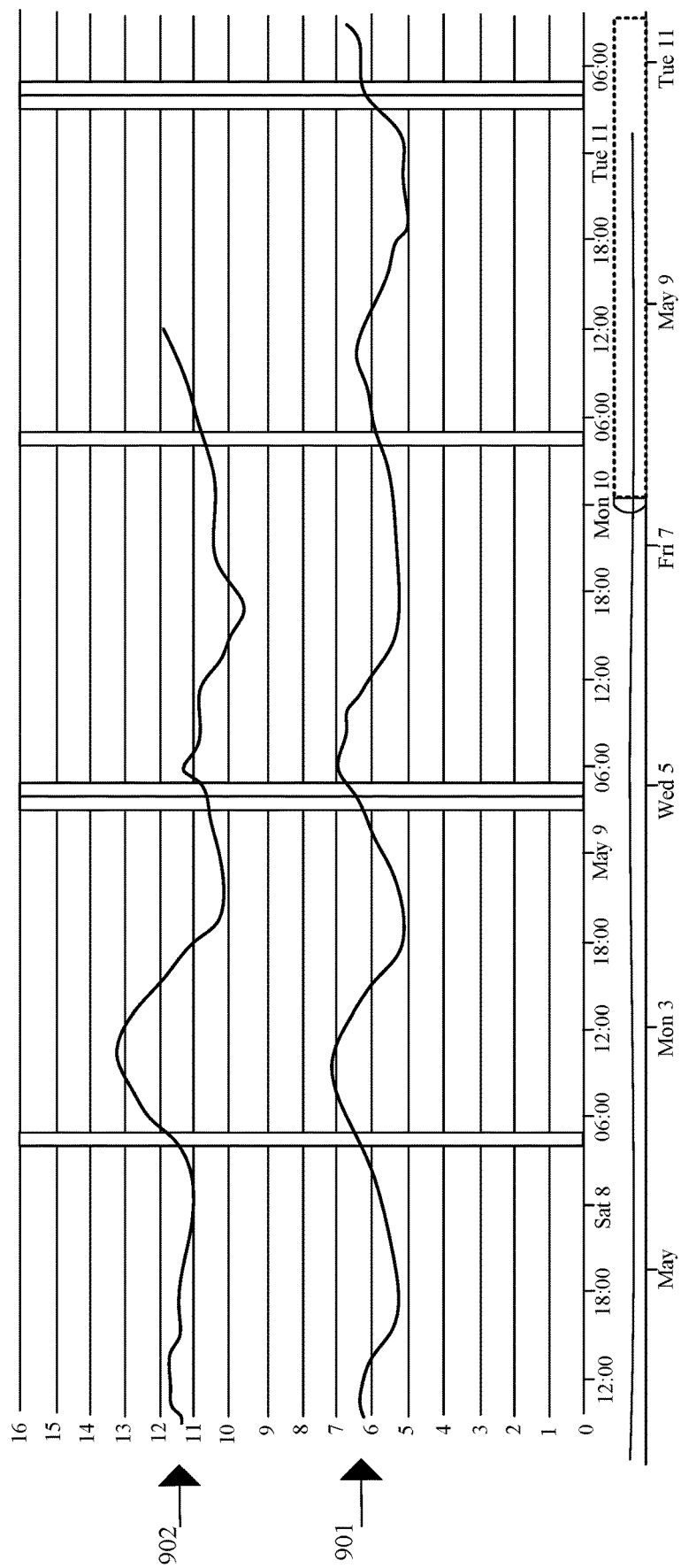
FIG. 9 illustrates a comparison between the latency times for gradual traffic roll out from 50% to 100% in conventional cluster system with the cluster system of exemplary embodiments.

FIG. 9 illustrates a comparison between the latency times for gradual traffic roll out from 50% to 100% in conventional cluster system (represented by reference 902) with the cluster system of exemplary embodiments described herein (represented by reference 901). In FIG. 9, the unit of measurement of the y axis is milliseconds, and the unit of measurement of the x axis is six hours. The average latency times during increased traffic roll out measured over a period of time is greatly reduced utilizing the cluster system described in exemplary embodiments compared to conventional approaches. Exemplary embodiments further require less connections to nodes in the cluster system than conventional systems while minimizing read/write times and latency.

Figure 10:
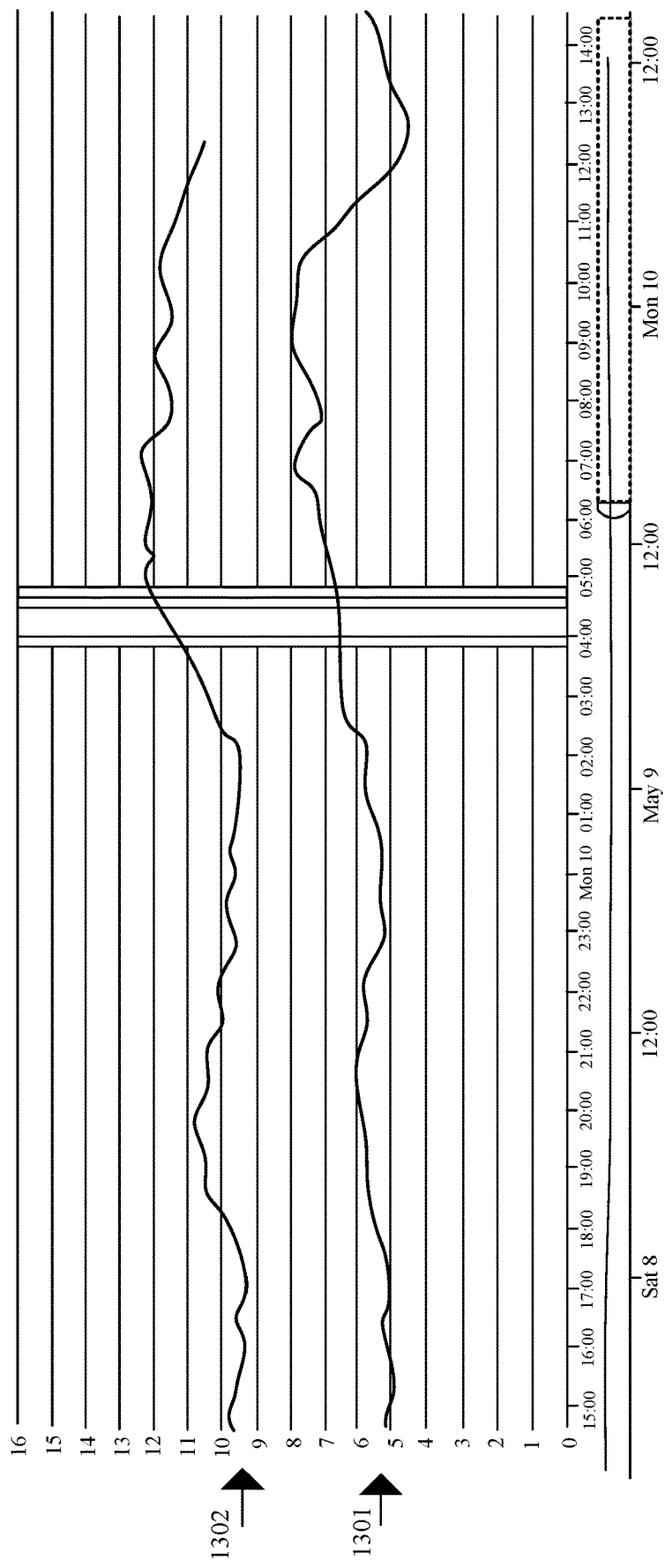
FIG. 10 illustrates a comparison between the read latency times of an alternative conventional system with the cluster system of exemplary embodiments.

FIG. 10 illustrates a comparison between the read latency times of an alternative conventional system (represented by reference 1002) with the cluster system of exemplary embodiments described herein (represented by reference 1001). In FIG. 10, the unit of measurement of the y axis is milliseconds, and the unit of measurement of the x axis is hours. The read latency times over a period of time is greatly reduced utilizing the cluster system described in exemplary embodiments compared to the alternative conventional system.

It is understood that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

What is claimed is:

1. A node management system, comprising:
    a cluster system comprising a plurality of nodes, wherein:
        the plurality of nodes includes a first node, and
        the first node includes a memory comprising one or more shards; and
    a client device in data communication with the plurality of nodes,
    wherein the first node is configured to:
        receive a client request,
        identify one of the one or more shards based on the client request,
        retrieve shard rules of the identified shard,
        determine an allocation of one or more memory slots of the identified shard based on the client request,
        lock the one or more memory slots,
        perform one or more operations on the one or more memory slots associated with the client request based on the allocation, and
        unlock the one or more memory slots.

2. The node management system of claim 1, wherein the first node is further configured to:
    determine an allocation of one or more database slots of the identified shard,
    lock the one or more database slots, and
    perform one or more operations on the one or more database slots based on the allocation; and
    unlock the one or more database slots.

3. The node management system of claim 1, wherein the first node is further configured to perform a hash function on a key in the client request and a modulo operation to determine the allocation of the one or more memory slots.

4. The node management system of claim 3, wherein the modulo operation is based on an available number of memory slots in the shard.

5. The node management system of claim 3, wherein the first node is further configured to:
    identify the one of the one or more shard based on one of a header or footer of the key in the client request or a container name of a client certificate associated with the client request.

6. The node management system of claim 1, wherein the shard rules comprise one of a cache capacity and a number of shards.

7. The node management system of claim 1, wherein the one or more operations comprise one of a read, write, update, push, or pull request.

8. The node management system of claim 1, wherein each of the one or more memory slots is associated with a key value pair.

9. The node management system of claim 2, wherein each of the one or more storage slots is associate with a column family.

10. A node management method, comprising the steps of:
    receiving a client request from a client device;
    identifying one of the one or more shard based on the client request;
    retrieving shard rules of the identified shard;
    determining an allocation of one or more memory slots of the identified shard based on the client request;
    locking the one or more memory slots;
    performing one or more operations on the one or more memory slots associated with the client request based on the allocation; and
    unlocking the one or more memory slots,
    wherein the one or more memory slots are locked when the one or more operations are performed.

11. The node management method of claim 10, further comprising:
    determining an allocation of one or more database slots of the identified shard; and
    performing one or more operations on the one or more database slots based on the allocation,
    wherein the one or more memory slots are locked when the one or more operations are performed.

12. The node management method of claim 10, further comprising updating a memory slot associated with the one or more storage slot based on the shard rules.

13. The node management method of claim 12, wherein the one or more memory slots represent a portion of an in memory least-recently used (LRU) component of the node, and the one or more storage slots represent one or more column families of a persistent storage component of the node.

14. The node management method of claim 13, further comprising:
    periodically backing up data stored in the in memory LRU component of the node, and the persistent storage component of the node into an backup persistent storage.

15. The node management method of claim 14, wherein the backup persistent storage is one of a remote storage or other disk based storage.

16. The node management method of claim 13, further comprising:
   storing an index of one or keys processed by the node; and
   retrieving a backup of data stored in the shard based on the index.

17. The node management method of claim 10 further comprising:
   encrypting a value associated with the memory slot associated with the client request; and
   storing the encrypted value in the memory slot.

18. A node management system, comprising:
   a plurality of nodes;
   wherein one of the plurality of nodes is configured to:
      receive a client request from a client device,
      update one of a memory slot or storage slot of the one of the plurality of nodes based on the client request, and
      asynchronously update another one of the plurality of nodes when the another one of the plurality of response nodes is an in-region node.

19. The node management system of claim 18, wherein the node is further configured to: asynchronously update a different another one of the plurality of nodes based on a key in the client request when the another one of the plurality of response nodes is an a cross-region node.

20. The node management system of claim 19, wherein the node is further configured to:
   asynchronously update the another one of the plurality of response nodes when the another one of the plurality of response nodes is an in-region node on a periodic basis;
   wherein any update occurring to the one of the nodes occurring during a period of time associated with the periodic basis is performed as a batch update.

* * * * *

UNITED STATES PATENT AND TRADEMARK OFFICE
CERTIFICATE OF CORRECTION

| | | |
|---|---|---|
| PATENT NO. | : 11,907,137 B2 | Page 1 of 1 |
| APPLICATION NO. | : 17/585387 | |
| DATED | : February 20, 2024 | |
| INVENTOR(S) | : Rohit Joshi and Ashish Gupta | |

It is certified that error appears in the above-identified patent and that said Letters Patent is hereby corrected as shown below:

On the Title Page

(72) Inventors: Rohit Joshi, "Plano, TX (US)" should read --Glen Allen, VA (US)--

Signed and Sealed this
Seventeenth Day of December, 2024

Derrick Brent
*Acting Director of the United States Patent and Trademark Office*